United States Patent [19]
Snell

[11] 4,202,554
[45] May 13, 1980

[54] BRUSH SEALS

[75] Inventor: Leonard S. Snell, Bristol, England

[73] Assignee: Rolls-Royce Limited, London, England

[21] Appl. No.: 39,605

[22] Filed: May 16, 1979

[30] Foreign Application Priority Data

May 17, 1978 [GB] United Kingdom ............... 20230/78

[51] Int. Cl.² .............................................. F16J 15/44
[52] U.S. Cl. ........................................ 277/53; 277/152
[58] Field of Search .................. 277/53, 152, DIG. 6, 277/237 R, 96.1, 96.2, 96, 230; 49/475; 405/147

[56] References Cited

U.S. PATENT DOCUMENTS

| 885,032 | 4/1908 | DeFerranti | 277/237 R X |
|---|---|---|---|
| 3,013,824 | 12/1961 | Wilson | 277/53 |
| 3,917,150 | 11/1975 | Ferguson et al. | 277/53 X |
| 4,057,971 | 11/1977 | Yamazaki | 405/147 |

Primary Examiner—Robert S. Ward, Jr.
Attorney, Agent, or Firm—Stevens, Davis, Miller & Mosher

[57] ABSTRACT

A brush seal which comprises a plurality of tightly-packed bristles (3) sandwiched in a space between a pair of axially-spaced annular side-plates (1,2). In order to minimize the gaps between the bristles at the outer radius of the seal the cross-sectional area of the space, and/or the bristles is varied, or alternatively the bristles are formed in an involute shape, and the cross-sectional area of the space is constant at all radii.

4 Claims, 5 Drawing Figures

BRUSH SEALS

The present invention relates to brush seals of the kind in which a plurality of tightly-packed bristles are sandwiched between a pair of axially spaced annular side-plates and project from one of the circumferential edges of the side-plates at an angle to the radius in the plane of the seal.

Because of the difference in diameters between the radially outer parts of the seal and the radially inner parts, if the bristles are straight and are tightly-packed at the radially inner diameter i.e. at their free ends, then there will be spaces between the bristles at the radially outer diameter. This forms a possible source of leakage through the seal.

Another source of leakage through the seal occurs when the bristles are fitted with an interference fit against a co-operating sealing surface which can cause buckling which, in turn, produces gaps between the bristles.

An object of the invention is to provide a brush seal in which leakage between the bristles is minimised.

According to the present invention a brush seal comprises a plurality of tightly-packed bristles sandwiched in a space between a pair of axially-spaced annular side-plates and having free ends projecting in the plane of the seal from a circumferential edge of the side-plate pair, the bristles and the space between the side-plates being dimensioned in relation to each other so that the cross-sectional area of the bristle material at any radius substantially completely fills the cross-sectional area of the space between the side-plates at that radius.

Thus, the bristles are made to lie alongside and in contact with each other along substantially the whole of their lengths, and spaces between the bristles are substantially eliminated.

In one embodiment of the invention the side-plates are parallel-sided and the bristles are curved into an involute shape in the plane of the seal.

Alternatively, the side-plates may be inclined to each other or may be of varying thickness so that they produce a space between them which narrows in a radial direction so that there is approximately a constant area between them at all radii. The bristles, in this embodiment, straight and of constant cross-sectional area.

As further alternatives the bristles may be of varying cross-sectional area, and the width of the space at different radii may be constant or varying.

Embodiments of the invention will now be more particularly described with reference to the accompanying drawing in which.

Figures 1A, 1B:
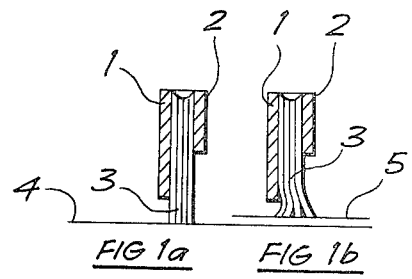
FIG. 1(a) illustrates a brush seal of the kind described with its bristles contacting a surface and in an undeflected state.
FIG. 1(b) shows the seal contacting a surface with an interference fit and illustrates the buckling of the bristle.
Figure 2:
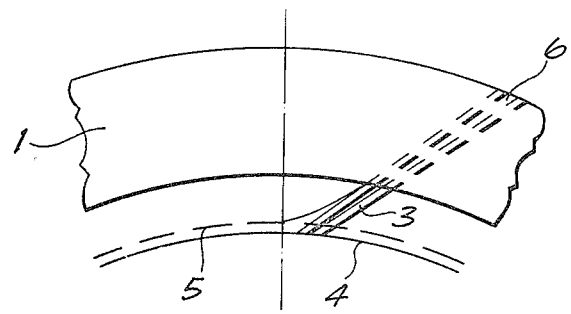
FIG. 2 is an enlarged elevation of a seal showing the gaps between the bristles.

Referring now to FIGS. 1(a) and 1(b), there can be seen a brush seal having a pair of side-plates 1 and 2 between which are sandwiched a plurality of bristles 3. The bristles have a free undeflected length which extends radially inwardly to the diameter of a surface 4. FIG. 1(b) shows how the bristles become deflected when the seal is fitted with an interference fit against a corresponding surface at a diameter 5. Referring now to FIG. 2 there is shown an elevation of a seal with bristles 3 extending radially inwardly from the side-plates 1 and 2. The view is enlarged and the bristle thickness, which would normally be about 0.025" diameter, is exaggerated to illustrate the gap 6 which is formed at the radially outer diameters, if the bristles are tightly packed at their radially inner diameter 5.

Clearly, the gaps between the bristles and the buckling of the bristles provide leakage paths for air to flow from one side of the seal to the other.

Figure 3:
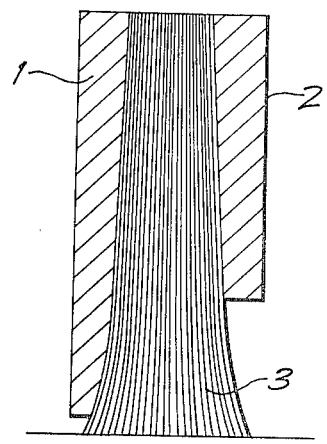
FIG. 3 shows a cross-section through a seal according to the invention.

FIG. 3 illustrates one way in which the leakage path can be reduced according to the invention. By making the side-plates 1 and 2 of varying thickness so that they taper from a greater thickness at the radially outer diameter to a lesser thickness at the radially inner diameter the space between them can have a constant area at any given radius. Thus, by using straight bristles of constant cross-sectional area the bristles will remain in contact along the whole of their length between the side-plates and leakage will be minimised. As an additional refinement the radially inner side wall of the longer side-plate can be made of a shape substantially the same as the deflected shape of the buckled bristles to minimise the buckling effect.

Figure 4:
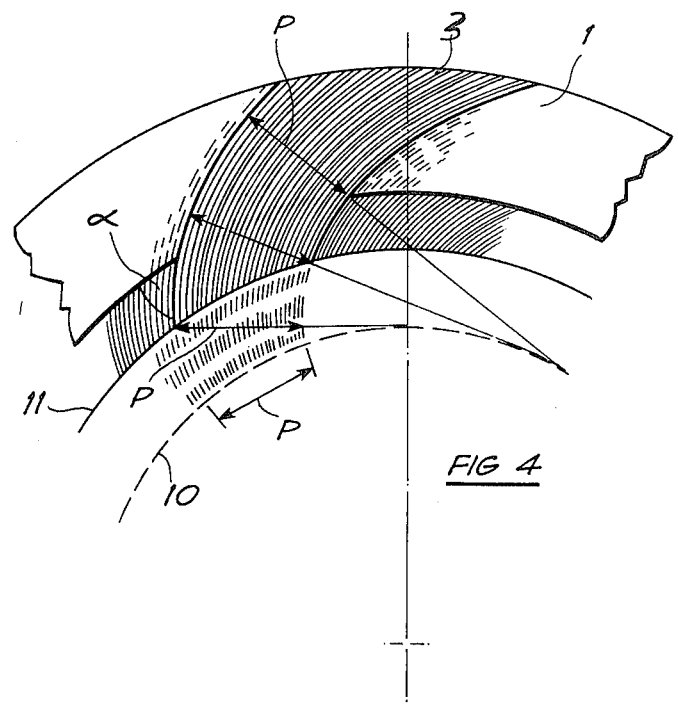
FIG. 4 shows an elevation of a seal according to an alternative embodiment of the invention.

Referring now to FIG. 4 there is shown a partly-sectioned elevation of an alternative form of the invention in which the bristles are formed in an involute shape. The involute curve has the property that it has a constant pitch p from an adjacent involute when measured along a tangent to the involute base circle. FIG. 4 illustrates bristles formed and packed together while curved in an involute shape, of all the involutes being formed on the same base circle, shown dotted at 10, so that all of the bristles will lie alongside and touching each other for the whole of their lengths.

The curved bristles are clamped between side-plates 1 and 2 as before and are cut off at the appropriate diameter of the co-operating sealing surface 11 so that they emerge from the side-plates at an appropriate angle of inclination α. In this embodiment the side-plate can be parallel-sided, hence, provided the co-efficient of friction between the bristles is overcome, the pack of the bristles can be formed to an involute shape simply by compressing them between parallel-sided side-plates. Since the wire is likely to require heat treatment, the bristles in the production process can be heat treated while compressed between parallel-sided side-plates so that they retain their involute shape when released and can be subsequently fitted into further side-plates.

I claim:

1. A brush seal comprising a plurality of tightly-packed bristles sandwiched in a space between a pair of axially-spaced annular side-plates and having free ends projecting in the plane of the seal from a circumferential edge of the side-plate pair, the bristles and the space between the side-plates being dimensioned in relation to each other so that the cross-sectional area of bristle material at any radius substantially completely fills the cross-sectional area of the space between the side-plates at that radius.

2. A brush seal according to claim 1 and in which the side-plates are parallel-sided and the bristles are curved into an involute shape in the plane of the seal.

3. A brush seal according to claim 1 and in which the side-plates define a space therebetween which narrows as the radius increases and the bristles are of constant cross-sectional area.

4. A brush seal as claimed in claim 1 and in which the free ends of the bristles project from a circumferential edge of the side-plate pair at an angle to the radius and in the plane of the seal.

* * * * *